US012292981B2

(12) United States Patent
Nguyen et al.

(10) Patent No.: US 12,292,981 B2
(45) Date of Patent: May 6, 2025

(54) METHOD AND SYSTEM FOR SECURITY ASSESSMENT (71) Applicant: VINAI ARTIFICIAL INTELLIGENCE APPLICATION AND RESEARCH JOINT STOCK COMPANY, Ha Noi (VN)

(72) Inventors: Tuan Anh Nguyen, Ha Noi (VN); Tuan Anh Tran, Ha Noi (VN); Hai Hung Bui, Ha Noi (VN)

(73) Assignee: VINAI Artificial Intelligence Application and Research Joint Stock Company, Ha Noi (VN)

( * ) Notice: Subject to any disclaimer, the term of this patent is extended or adjusted under 35 U.S.C. 154(b) by 271 days.

(21) Appl. No.: 17/836,686

(22) Filed: Jun. 9, 2022

(65) Prior Publication Data
US 2022/0398325 A1    Dec. 15, 2022

(30) Foreign Application Priority Data

Jun. 9, 2021 (VN) .............................. 1-2021-03426

(51) Int. Cl.
*G06F 21/57* (2013.01)
*G06F 21/55* (2013.01)
*G06F 21/56* (2013.01)
*G06F 30/20* (2020.01)

(52) U.S. Cl.
CPC .......... *G06F 21/577* (2013.01); *G06F 21/554* (2013.01); *G06F 21/56* (2013.01); *G06F 30/20* (2020.01); *G06F 2221/034* (2013.01)

(58) Field of Classification Search
CPC ...... G06F 21/577; G06F 21/554; G06F 21/56; G06F 30/20; G06F 30/27; G06F 2221/034
See application file for complete search history.

(56) References Cited

U.S. PATENT DOCUMENTS

2021/0287083 A1*  9/2021  Bharadwaj ............... G06N 3/08
2021/0300433 A1*  9/2021  Vorobeychik ........... G06F 18/24
2022/0053005 A1*  2/2022  Liu .......................... G06F 18/22

* cited by examiner

*Primary Examiner* — Farid Homayounmehr
*Assistant Examiner* — Brian William Avery
(74) *Attorney, Agent, or Firm* — United One Law Group LLC; Kongsik Kim; Jhongwoo Peck (57) ABSTRACT

A method and system for security assessment include a simulator configured to simulate a warping-based backdoor attack and an evaluation module configured to evaluate security and output a warning about a backdoor risk. The simulator, which comprises a warping unit and a backdoor model, is configured to generate a warping field, the warping unit is configured to receive the clean image and the warping field as inputs and output the warped backdoor image and the simulator is configured to train the backdoor model using the warped backdoor image.

15 Claims, 10 Drawing Sheets

(a) Changing control-grid size $k$ ($s = 0.5$)

(b) Changing warping strength $s$ ($k = 4$)

| Dataset | Clean | Attack | Noise |
|---|---|---|---|
| MNIST | 99.52 | 99.86 | 98.20 |
| CIFAR-10 | 94.15 | 99.55 | 93.55 |
| GTSRB | 98.97 | 98.78 | 98.01 |
| CelebA | 78.99 | 99.33 | 76.74 |

(a) Network performance (b) Sample backdoor images (c) Physical attack test

(a) Trigger patterns optimized by Neural Cleanse (small is bad)  (b) Model performance when changing $s$  (c) Model performance when changing $k$

FIG. 10

METHOD AND SYSTEM FOR SECURITY ASSESSMENT

CROSS-REFERENCE TO RELATED APPLICATION(S)

This application claims priority from Vietnamese Application No. 1-2021-03426 filed on Jun. 9, 2021, which application is incorporated herein by reference in its entirety.

BACKGROUND

1. Technical Field

Embodiments of the present invention relate to a method and system for security assessment, and more specifically, to a method and system for security assessment using warping-based triggers.

2. Related Art

Nowadays, deep neural networks have become a crucial part of artificial intelligence systems thanks to their superior performance. However, training a state-of-the-art network require a massive training dataset as well as enormous computational resource. Therefore, many companies use pre-trained models provided by third-parties. However, these results in a potential security threat that third-parties have full control of training pipeline and may intentionally leave a security hole—backdoor effect into the trained models. On the one side, these models perform well on normal inputs, on the other side misbehave if the inputs have pre-defined features.

Nonetheless, existing works on backdoor attack rely on patching or superimposing input images to create poisoned training samples. This is a trivial weakness that the factors that cause backdoor effect on the input images are irrelevant to the images' intrinsic information. This became a crucial weakness that has been exploited by existing defense mechanisms. It raises awareness of deep models' security and requires more advanced backdoor defenses.

In the previous attack methods, the backdoor mechanisms rely on additional triggers pasted into the input images. Hence, they are easy to be detected and mitigated, resulting in weak and straightforward backdoor defense methods.

In the attack mode for image classification, backdoor models may return a predefined attack label that is normally incorrect, regardless of image content. Accordingly, the attacker may gain illegal benefits. For example, when a facial authentication system poisoned by backdoor attack is used, the attacker may access the facial authentication system whenever he or she puts a specific sticker on his or her face. Backdoors may be injected into the deep model at any stage. Since the backdoor model is the most used threat model, model poisoning should be considered when training.

The attacker has total control over the training process and maliciously alters data for his or her attack purposes. The poisoned model is then delivered to customers to deploy as it is.

CITATION LIST

Non Patent Literature

Mauro Barni, Kassem Kallas, and Benedetta Tondi. A new backdoor attack in cnns by training set corruption without label poisoning. In 2019 IEEE International Conference on Image Processing (ICIP), pp. 101-105. IEEE, 2019. The citation is herein referred to as (Barni et al., 2019).

Xinyun Chen, Chang Liu, Bo Li, Kimberly Lu, and Dawn Song. Targeted backdoor attacks on deep learning systems using data poisoning. arXiv preprint arXiv:1712.05526, 2017. The citation is herein referred to as (Chen et al., 2017).

Hao Cheng, Kaidi Xu, Sijia Liu, Pin-Yu Chen, Pu Zhao, and Xue Lin. Defending against Backdoor Attack on Deep Neural Networks. In Proceedings of the 25th ACM SIGKDD International Conference on Knowledge Discovery & Data Mining Workshop, 2019. The citation is herein referred to as (Cheng et al. (2019).

Jiazhu Dai, Chuanshuai Chen, and Yufeng Li. A backdoor attack against 1stm-based text classification systems. IEEE Access, 7:138872-138878, 2019. The citation is herein referred to as (Dai et al., 2019).

Bao Gia Doan, Ehsan Abbasnej ad, and Damith C. Ranasinghe. Februus: Input Purification Defense Against Trojan Attacks on Deep Neural Network Systems. arXiv, August 2019. URL https://arxiv.org/abs/1908.03369. The citation is herein referred to as (Doan et al. 2019).

Jean Duchon. Splines minimizing rotation-invariant semi-norms in sobolev spaces. In Constructive theory of functions of several variables, pp. 85-100. Springer, 1977. The citation is herein referred to as (Duchon, 1977).

Yansong Gao, Change Xu, Derui Wang, Shiping Chen, Damith C Ranasinghe, and Surya Nepal. Strip: A defence against trojan attacks on deep neural networks. In Proceedings of the 35$^{th}$ Annual Computer Security Applications Conference, pp. 113-125, 2019. The citation is herein referred to as (Gao et al., 2019).

Tianyu Gu, Brendan Dolan-Gavitt, and Siddharth Garg. Badnets: Identifying vulnerabilities in the machine learning model supply chain. In Proceedings of Machine Learning and Computer Security Workshop, 2017. The citation is herein referred to as (Gu et al., 2017).

Ronan Hamon, Henrik Junklewitz, and Ignacio Sanchez. Robustness and explainability of artificial intelligence. Publications Office of the European Union, 2020. The citation is herein referred to as (Hamon et al., 2020).

Kaiming He, Xiangyu Zhang, Shaoqing Ren, and Jian Sun. Identity mappings in deep residual networks. In European conference on computer vision, pp. 630-645. Springer, 2016. The citation is herein referred to as (He et al., 2016).

Max Jaderberg, Karen Simonyan, Andrew Zisserman, et al. Spatial transformer networks. In Advances in neural information processing systems, pp. 2017-2025, 2015. The citation is herein referred to as (Jaderberg et al., 2015).

Liu Kang, pytorch-cifar, May 2020. URL https://github.com/kuangliu/pytorch-cifar. [Online; accessed 4. Jun. 2020]. The citation is herein referred to as (Kang (2020).

Soheil Kolouri, Aniruddha Saha, Hamed Pirsiavash, and Heiko Hoffmann. Universal litmus patterns: Revealing backdoor attacks in cnns. In Proceedings of the IEEE/CVF Conference on Computer Vision and Pattern Recognition, pp. 301-310, 2020. The citation is herein referred to as (Kolouri et al. 2020).

Alex Krizhevsky et al. Learning multiple layers of features from tiny images. 2009. The citation is herein referred to as (Krizhevsky et al., 2009).

Yann LeCun, L'eon Bottou, Yoshua Bengio, and Patrick Haffner. Gradient-based learning applied to document recognition. Proceedings of the IEEE, 86(11):2278-2324, 1998. The citation is herein referred to as (LeCun et al., 1998).

Kang Liu, Brendan Dolan-Gavitt, and Siddharth Garg. Fine-pruning: Defending against backdooring attacks on deep neural networks. In Proceedings of International Symposium on Research in Attacks, Intrusions, and Defenses, 2018a. The citation is herein referred to as (Liu et al., 2018a).

Yingqi Liu, Shiqing Ma, Yousra Aafer, Wen-Chuan Lee, Juan Zhai, Weihang Wang, and Xiangyu Zhang. Trojaning attack on neural networks. In Proceedings of Network and Distributed System Security Symposium, 2018b. The citation is herein referred to as (Liu et al., 2018b).

Yingqi Liu, Wen-Chuan Lee, Guanhong Tao, Shiqing Ma, Yousra Aafer, and Xiangyu

Zhang. Abs: Scanning neural networks for back-doors by artificial brain stimulation. In Proceedings of the 2019 ACM SIGSAC Conference on Computer and Communications Security, pp. 1265-1282, 2019. The citation is herein referred to as (Liu et al., 2019).

Yunfei Liu, Xingjun Ma, James Bailey, and Feng Lu. Reflection backdoor: A natural backdoor attack on deep neural networks. 2020. The citation is herein referred to as (Liu et al., 2020).

Ziwei Liu, Ping Luo, Xiaogang Wang, and Xiaoou Tang. Deep learning face attributes in the wild. In Proceedings of International Conference on Computer Vision (ICCV), December 2015. The citation is herein referred to as (Liu et al., 2015).

Ahmed Salem, RuiWen, Michael Backes, Shiqing Ma, and Yang Zhang. Dynamic backdoor attacks against machine learning models. arXiv preprint arXiv:2003.03675, 2020. The citation is herein referred to as (Salem et al., 2020).

Ramprasaath R Selvaraju, Michael Cogswell, Abhishek Das, Ramakrishna Vedantam, Devi Parikh, and Dhruv Batra. Grad-cam: Visual explanations from deep networks via gradient-based localization. In Proceedings of the IEEE international conference on computer vision, pp. 618-626, 2017. The citation is herein referred to as (Selvaraju et al., 2017).

Johannes Stallkamp, Marc Schlipsing, Jan Salmen, and Christian Igel. Man vs. computer: Benchmarking machine learning algorithms for traffic sign recognition. Neural networks, 32:323-332, 2012. The citation is herein referred to as (Stallkamp et al., 2012).

Brandon Tran, Jerry Li, and Aleksander Madry. Spectral signatures in backdoor attacks. In Proceedings of Advances in Neural Information Processing Systems, 2018. The citation is herein referred to as (Tran et al., 2018).

Alexander Turner, Dimitris Tsipras, and Aleksander Madry. Clean-label backdoor attacks. https://people.csail.mit-.edu/madry/lab/, 2019. The citation is herein referred to as (Turner et al., 2019).

Sakshi Udeshi, Shanshan Peng, Gerald Woo, Lionell Loh, Louth Rawshan, and Sudipta Chattopadhyay. Model agnostic defence against backdoor attacks in machine learning. arXiv preprint arXiv:1908.02203, 2019. The citation is herein referred to as (Udeshi et al., 2019).

Bolun Wang, Yuanshun Yao, Shawn Shan, Huiying Li, Bimal Viswanath, Haitao Zheng, and Ben Y Zhao. Neural cleanse: Identifying and mitigating backdoor attacks in neural networks. In Proceedings of 40th IEEE Symposium on Security and Privacy, 2019. The citation is herein referred to as (Wang et al., 2019).

Yuanshun Yao, Huiying Li, Haitao Zheng, and Ben Y Zhao. Latent backdoor attacks on deep neural networks. In Proceedings of the 2019 ACM SIGSAC Conference on Computer and Communications Security, pp. 2041-2055, 2019. The citation is herein referred to as (Yao et al., 2019).

Richard Zhang, Phillip Isola, *Alexei* A Efros, Eli Shechtman, and Oliver Wang. The unreasonable effectiveness of deep features as a perceptual metric. In CVPR, 2018. The citation is herein referred to as (Zhang et al., 2018).

Pu Zhao, Pin-Yu Chen, Payel Das, Karthikeyan Natesan Ramamurthy, and Xue Lin. Bridging mode connectivity in loss landscapes and adversarial robustness. In International Conference on Learning Representations, 2019. The citation is herein referred to as (Zhao et al., 2019).

SUMMARY

The present invention is directed to providing a system for security assessment which simulates and evaluates a new warping-based backdoor method in which the backdoor image is generate based on image warping.

The present invention is also directed to providing a system for security assessment which simulates and evaluates a backdoor method that is not visually checkable and that may pose a practical threat to a deep learning system by bypassing all existing defense methods.

According to an aspect of the present invention, there is provided a method for security assessment, the method comprising simulating, by a simulator, a warping-based backdoor attack; and evaluating, by an evaluation module, security and output a warning about a backdoor risk.

According to an embodiment, the simulating comprises receiving, by a warping unit, a clean image as an input and outputting a warped backdoor image; and using, by a backdoor model, the warped backdoor image during training and attacking.

According to an embodiment, the method comprises generating, by the simulator, a warping field; receiving, by the warping unit, the clean image and the warping field as inputs and outputting the warped backdoor image; and training, by the simulator, the backdoor model by using the warped backdoor image.

According to an embodiment, the generating the warping field comprises determining control points, wherein the simulator selects target points on a uniform grid of a predetermined size over the entire clean image and generates a backward warping field of the selected target points; upsampling by interpolating an interpolated warping field of the entire clean image from the control points by applying a bicubic interpolation; and clipping the interpolated warping field to generate the warping field.

According to an embodiment, the predetermined size of the uniform grid is k×k, where k<6; and a parameter s defining the strength of the backward warping field is below 0.75.

According to an embodiment, the training the backdoor model, for each clean image, comprises selecting one of clean mode, attack mode and noise mode randomly; and training the backdoor model in the selected mode.

According to an embodiment, the training the backdoor model in the clean mode comprises classifying, by the backdoor model, the clean image into a clean label corresponding to the clean image.

According to an embodiment, the training the backdoor model in the attack mode comprises classifying, by the backdoor model, the warped backdoor image into an attack label.

According to an embodiment, the training the backdoor model in the noise mode comprises generating, by the simulator, a noise warping field by adding random noise to the warping field; receiving, by the warping unit, the clean image and the noise warping field as inputs and outputting a noise warped backdoor image; and classifying, by the backdoor model, the noise warped backdoor image into the clean label corresponding to the clean image.

According to an embodiment, the noise warping field is generated by adding Gaussian noise to the warping field.

According to another aspect of the present invention, there is provided a system for security assessment, the system comprising one or more processors; one or more memories including computer executable instructions; a simulator; and an evaluation module; wherein the one or more memories and the computer executable instructions configured to, with the one or more processors, cause the system to perform operations comprising: simulating, by the simulator, a warping-based backdoor attack; and evaluating, by the evaluation module, security and output a warning about a backdoor risk.

According to an embodiment, the simulator includes a warping unit configured to receive a clean image as an input and output a warped backdoor image; and a backdoor model configured to use the warped backdoor image during training and attacking.

According to yet another aspect of the present invention, there is provided a non-transitory computer-readable storage medium comprising instructions that, when executed by at least one processor of a machine, cause the machine to perform simulating, by the simulator, a warping-based backdoor attack; and evaluating, by the evaluation module, security and output a warning about a backdoor risk.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Hereinafter, exemplary embodiments of the present invention will be described in detail with reference to the accompanying drawings.

However, it should be understood that the technical spirit of the present invention is not limited to the embodiments to be disclosed below but may be implemented in many different forms. It should be understood that within the scope of the present invention, one or more elements of each of the embodiments may be selectively combined and substituted.

In addition, the terms (including technical and scientific terms) used in the embodiments of the present invention have the same meaning as commonly understood by one of ordinary skill in the art to which the present invention belongs. It should be further understood that terms, such as those defined in commonly used dictionaries, should be interpreted as having a meaning that is consistent with their meaning in the context of the related art.

Further, the terms used in the embodiments of the present invention are provided only to describe the embodiments of the present invention and not for purposes of limitation.

In this specification, the singular forms include the plural forms unless the context clearly indicates otherwise, and the phrase "at least one element (or one or more elements) of an element A, an element B, and an element C," should be understood as meaning one or more of all combinations being obtained by combining the element A, the element B, and the element C.

Further, in describing elements of the present invention, terms such as first, second, A, B, (a), and (b) may be used. These terms are used to distinguish one element from another element but the nature, an order, or a sequence of the elements is not limited by the terms.

It should be understood that when one element is referred to as being "connected" or "coupled" to another element, it can be directly connected or coupled to another element, or it can be connected or coupled to another element with still another element interposed therebetween.

Further, when an element is described as being formed "on (above)" or "under (below)" another element, the term "on (above)" or "under (below)" includes both of a case in which the two elements are in direct contact with each other and a case in which one or more other elements are disposed between the two elements. In addition, the term "on (above)" or "under (below)" includes a case in which another element is disposed in an upward direction or a downward direction with respect to one element.

Hereinafter, embodiments will be described in detail with reference to the accompanying drawings, the same or corresponding components are denoted by the same reference numerals regardless of reference numbers, and thus the description thereof will not be repeated.

Deep learning models are essential in many modern systems due to their superior performance compared to classical methods. However, most state-of-the-art models require expensive hardware, a huge amount of training data, and a long training time. Therefore, instead of training the models from scratch, it is a common practice to use pre-trained networks provided by third-parties these days.

However, the practice may pose a serious security threat of backdoor attacks. A backdoor model refers to a network poisoned during training or fine tuning. The backdoor model may act as a genuine model in normal conditions. However, when a specific trigger appears in the input, the model will act maliciously, as designed by the attacker.

Backdoor attack may occur in various tasks, including image recognition, speech recognition, natural language processing, reinforcement learning, and the like.

In an embodiment, among the above tasks, image classification, which is the most popular attacking target and can lead to fatal consequences (e.g., for self-driving car), may be focused on.

Since being introduced, backdoor attacks have drawn a lot of research interest. In most tasks related to backdoor attacks, trigger patterns are based on patch perturbation or image blending. Recent papers have proposed novel patterns such as sinusoidal strips (Barni et al., 2019) and reflectance (Liu et al., 2020). However, these backdoor triggers are unnatural and can be easily spotted by humans. The added content, such as noise, strips, or reflectance, causes the backdoor samples generated by the previous methods to be strikingly detectable.

In an embodiment, focusing on the fact that machines are excellent for the task of recognizing subtle image warping, a simulation of a backdoor attack using an image warping method that can deform but preserve image content and a security evaluation process using the same will be described.

Image warping is a basic image processing technique that deforms an image by applying geometric transformation. The transformation may be affine, projective, elastic, or non-elastic. In an embodiment, the simulator may use elastic image warping.

The most popular elastic warping technique is Thin-Plate Splines (TPS) (Duchon, 1977). TPS may interpolate a smooth warping field to transform the entire image given a set of control points with known original and target two-dimensional (2D) coordinates. TPS was adopted in spatial transformer networks (Jaderberg et al., 2015), which is the first deep learning study incorporating differential image warping.

Elastic image warping may be utilized to generate invisible backdoor triggers. Unlike previous attack methods that introduce extra and independent information to an input image, the elastic image warping only manipulates existing pixels of the image. Humans, while being excellent in spotting an incongruent part of an image, are bad at recognizing small geometric transformations.

The system for security assessment according to the embodiment may simulate a warping-based backdoor attack. A backdoor model, which is a simulation target, is a technique for injecting a hidden destructive functionality into a deep learning model, and the backdoor model misbehaves only when a trigger pattern appears in the input. The backdoor model may work genuinely on clean inputs but return predefined outputs when triggered, and thus the attacker may secretly exploit the backdoor to gain illegal benefits from the system.

The attack of the backdoor model simulated according to the embodiment is also undetectable by various backdoor defense mechanisms, and no existing algorithms may recognize or mitigate the backdoor. This is because the attack mechanism is drastically different from any existing attack and breaks the assumptions of all defense methods.

Figure 2:
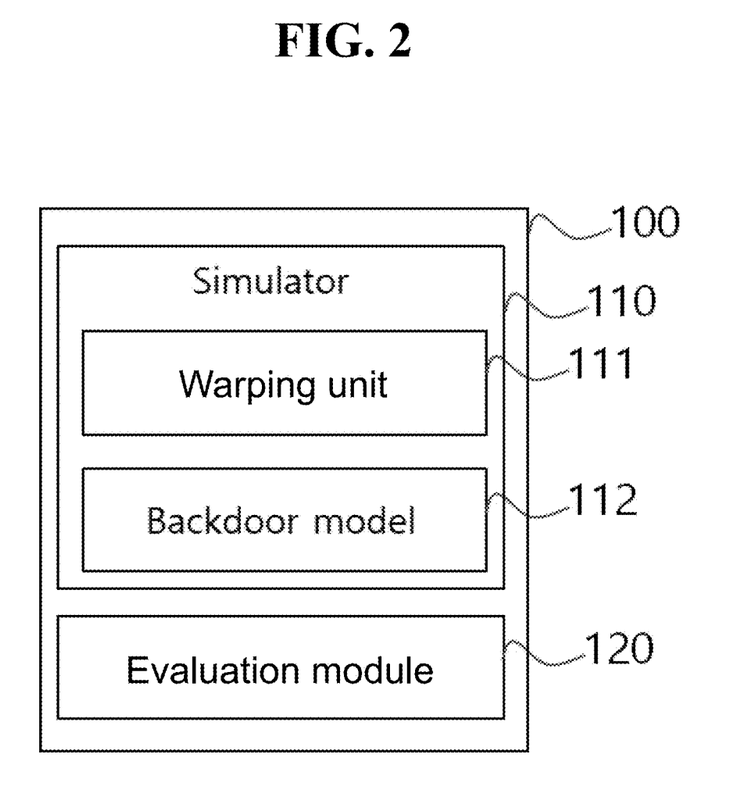
FIG. 2 is a diagram of a system for security assessment according to an embodiment of the present disclosure.

FIG. 2 is a diagram of a system for security assessment according to an embodiment. Referring to FIG. 2, a system 100 for security assessment according to the embodiment may include a simulator 110 configured to simulate a warping-based backdoor attack and an evaluation module 120 configured to evaluate security and output a warning about a backdoor risk.

In an embodiment, the simulator 110 may include a warping unit 111 configured to receive a clean image as an input and output a warped backdoor image corresponding thereto, and a backdoor model 112 configured to use the warped backdoor image during training and attacking.

In an embodiment, the warping unit 111 may receive a clean image and a warping field as inputs to output a corresponding backdoor image.

In an embodiment, the backdoor model 112 may receive the clean image as an input in a normal mode and return a genuine output label which is a clean label corresponding to the clean image, and may receive a warped backdoor image as an input in an attack mode and return an attack label.

In an embodiment, the backdoor model 112 may receive a backdoor image as an input and output a prediction score for the attack label.

In an embodiment, the evaluation module 120 may use the attack label to output a warning about a backdoor risk.

Specifically, in an embodiment, a novel, simple, but effective backdoor attack based on image warping called WaNet will be simulated and the security performance thereof will be evaluated. The WaNet, which is a novel backdoor attack method that stands for warping-based poisoned networks, is designed to be stealthy in both machine and human inspections.

Figure 1:
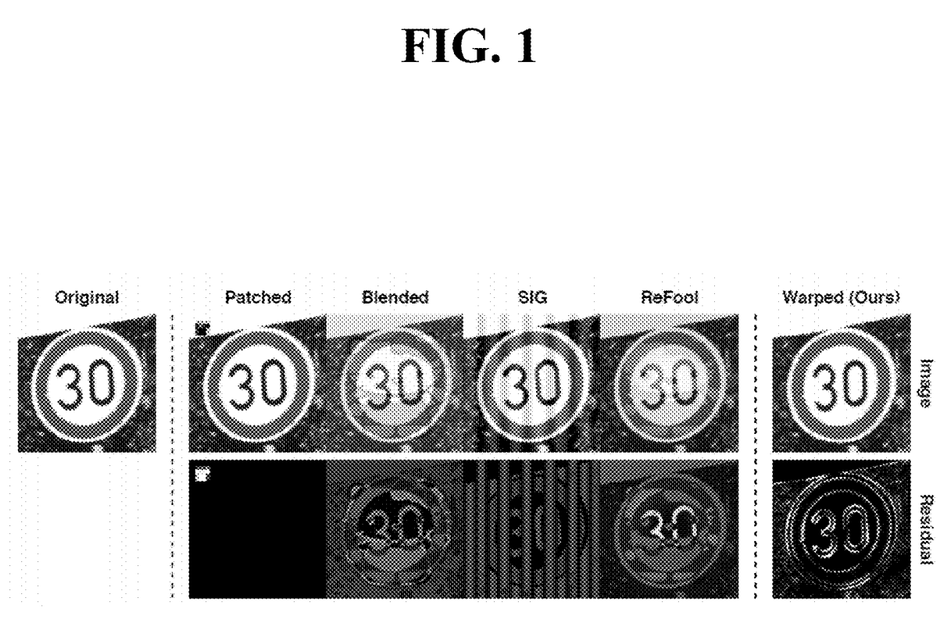
FIG. 1 is a diagram illustrating comparison between backdoor examples generated by the method of the invention and by the previous backdoor attacks.

In an embodiment, a small and smooth warping field may be used in generating backdoor images, and the modification may be made unnoticeable, as illustrated in FIG. 1. In addition, the generated backdoor images are natural and hard to be distinguished from the genuine examples.

In an embodiment, in order to obtain the backdoor model 112, the simulator 110 first follows the common training procedure by poisoning a part of training data with a fixed ratio of $\rho_a \in (0,1)$ While the trained networks provide high clean and attack accuracy, it was found that the trained networks "cheated" by learning pixel-wise artifacts instead of the warping itself. This causes the trained networks to be easily caught by the popular backdoor defense Neural Cleanse. Instead, another mode, which is called a "noise mode," is added in training to force the models to learn only the predefined backdoor warp. Such a novel training scheme may generate satisfactory models that are both effective and stealthy.

The attack method of the backdoor model simulated according to the embodiment may achieve invisibility without sacrificing accuracy. The above attack method may be performed similarly to state-of-the-art backdoor methods in terms of clean and attack accuracy, which are verified on common benchmarks such as MNIST, CIFAR-10, GTSRB, and CelebA.

In an embodiment, it is assumed that a classification network is a function $f: \mathbb{X} \rightarrow \mathbb{C}$, in which $\mathbb{X}$ denotes an input image domain and $\mathbb{C}$ denotes a set of target classes. In order to train the function $f$, a training dataset $\mathbb{S} = \{(x_i, y_i) | x_i \in \mathbb{X}, y_i \in \mathbb{C}, i=1, N\}$ is provided. The system 100 for security assessment according to the embodiment follows the training scheme of BadNets for poisoning a subset of $\mathbb{S}$ with a ratio $\rho_a$ for training of the backdoor model 112. Each clean pair (x, y) is replaced by a backdoor pair ($\mathcal{B}(x), c(y)$). Here, B denotes a backdoor injection function and c(y) denotes an attack label function.

The injection function B may be redesigned based on image warping. The simulator 110 constructs B using a warping function W and a predefined warping field M, as Equation 1 below.

$$\mathcal{B}(x) = \mathcal{W}(x, M) \quad \text{[Equation 1]}$$

The warping field M acts like a motion field, and defines a relative sampling location of backward warping for each point in the target image. The warping function W allows a floating-point warping field as an input. When a sampling pixel falls on non-integer 2D coordinates, the sampling pixel is bi-linear interpolated. In order to implement the warping function W, the simulator may use the public API grid_sample provided by PyTorch. However, the above API should input a grid of normalized absolute 2D coordinates of the sampling point. Therefore, to use the API, the warping field M is summed with an identity sampling grid, and then normalized to [−1; 1] to obtain the required grid input.

The warping field M is a crucial component and it should ensure that the warped images are both natural and effective for attacking purposes. Therefore, it is desired that the warping field M satisfies the following properties:

Small: the warping field M should be small and unnoticeable to humans,

Elastic: the warping field M should be elastic, that is, smooth and non-flat, to generate natural looking images, Within image boundary: the warping field M should not exceed the image boundary, to avoid generating a suspicious black/plain outer area.

In order to obtain the warping field, the simulator 110 may borrow the idea of using control points from TPS but simplify the interpolation method.

Figure 3:
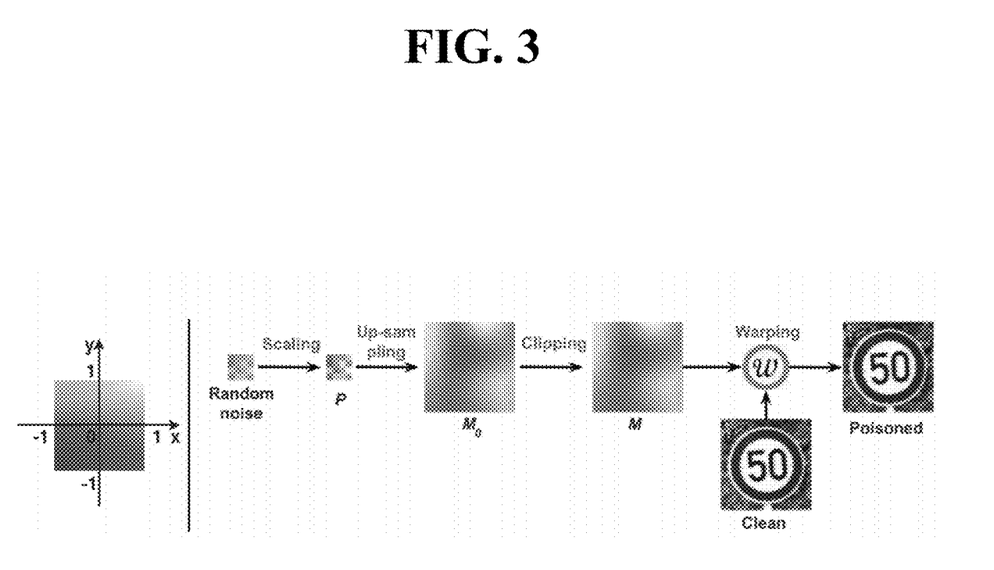
FIG. 3 is a diagram of a system for process of creating the warping field M and using it to generate poisoned images.

The process of generating the desired warp is illustrated in FIG. 3 and may be generated through control grid selection, upsampling, and clipping processes.

The control grid selection is performed by the simulator 110. First, the simulator 110 selects the control points. For simplicity, the target points on a uniform grid of size k×k are selected over the entire clean image. A backward warping field is denoted as $P \in \mathbb{R}^{k \times k \times 2}$. The simulator 110 uses a parameter s to define the strength of P and generate P as Equation 2 below.

$$P = \psi(\text{rand}_{[-1,1]}(k,k,2)) \times s \qquad \text{[Equation 2]}$$

In Equation 2, $\text{rand}_{[-1, 1]}( \ldots )$ denotes a function which returns a random tensor with the input shape and element value in the range [−1, 1], and ψ denotes a normalization function. In an embodiment, the simulator 110 normalizes the tensor elements by their mean absolute value as Equation 3 below.

$$\psi(A) = \frac{A}{\frac{1}{\text{size}(A)} \sum_{a_i \in A} |a_i|} \qquad \text{[Equation 3]}$$

The simulator 110 performs upsampling by interpolating the warping field of the entire clean image from the control points. Since the control points are present in a uniform grid covering the entire clean image, instead of using complex spline-based interpolation like in TPS, bicubic interpolation may be simply applied. The output of the above process is denoted as $\text{Mo} = \uparrow P \in \mathbb{R}^{h \times w \times 2}$ and h and w denote a height and width of the image, respectively.

Finally, the simulator 110 applies a clipping function φ so that the sampling points do not fall outside of the image border. The simulator 110 generates the warping field M as Equation 4 below.

$$M = \phi(\uparrow(\psi(\text{rand}_{[-1,1]}(k,k,2)) \times s)) \qquad \text{[Equation 4]}$$

Figure 4:
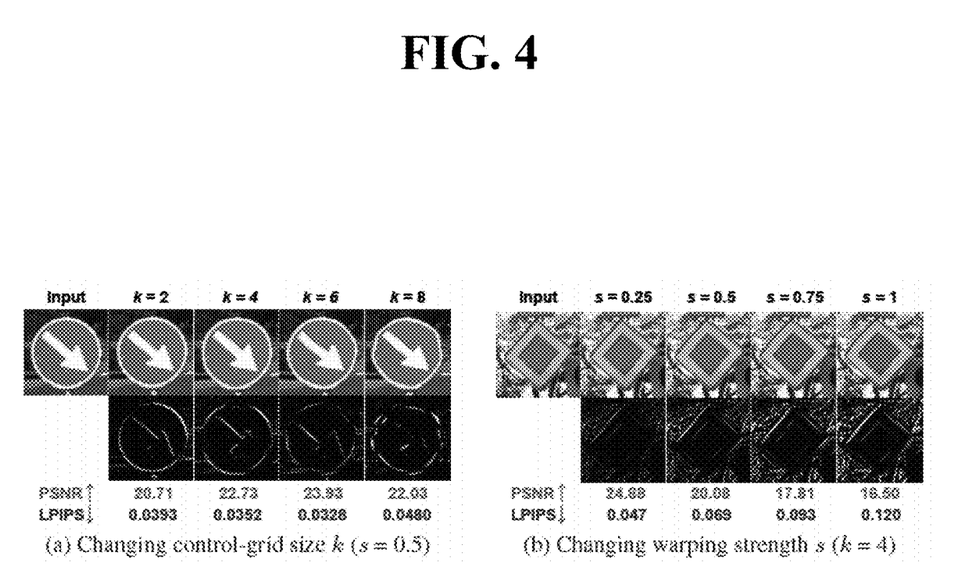
FIG. 4 is a diagram of effect of different hyper-parameters on the warping result.

The qualitative effect of hyper-parameters k and s of the generated image may be evaluated as in FIG. 4. As can be seen in FIG. 4, the warping effect is almost invisible when k<6 and s<0.75.

After the simulator 110 calculates the warping field M, the simulator 110 may train WaNet using two modes, clean and attack, as the standard protocol. However, the models trained by that algorithm, while still achieving high accuracy in both clean and attack tests, tend to learn pixel-level artifacts instead of the warping. Therefore, the models may be easily exposed by a backdoor defense method such as Neural Cleanse.

In an embodiment, the simulator 110 generates the backdoor model through a new training mode, which is called a noise mode, together with the clean and attack modes. When a random noise warping field M' ≠M is applied, the simulator 110 should not trigger the backdoor but return the correct class prediction.

Figure 5:
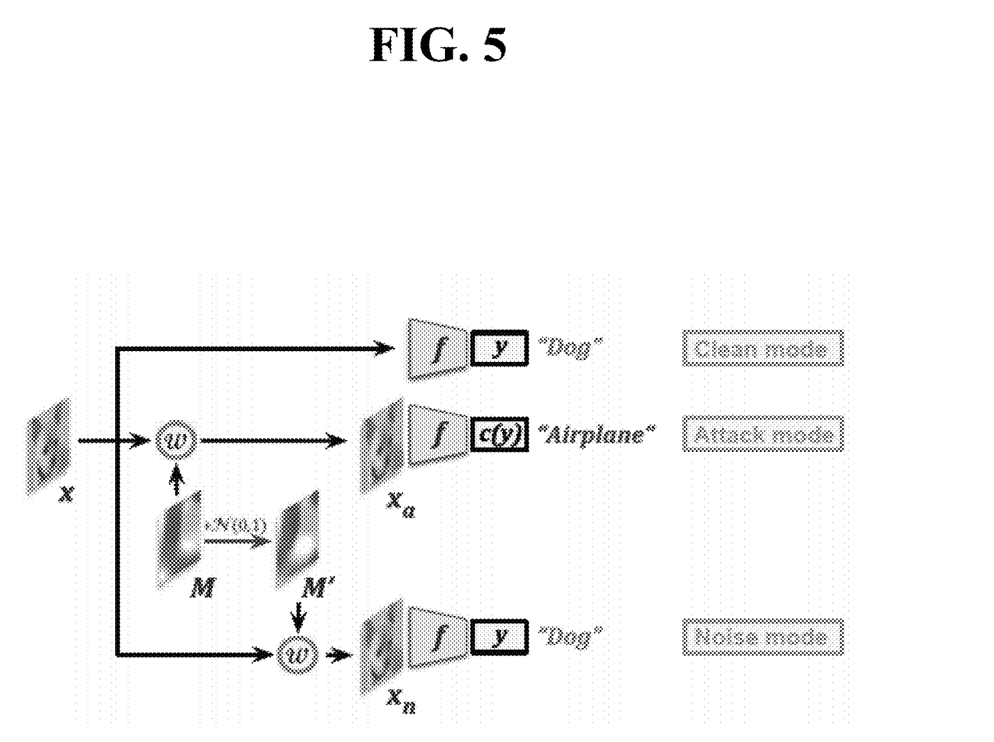
FIG. 5 is a diagram of training pipeline with three running modes.
Figure 6:
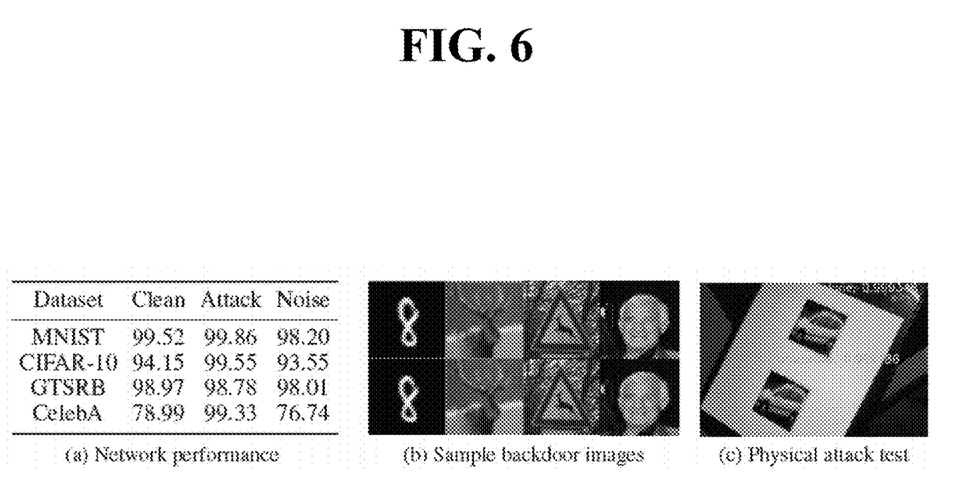
FIG. 6 is a diagram of attack experiments.

FIG. 5 illustrates three running modes in training pipelines. Referring to FIG. 5, the simulator 110 first selects the backdoor probability $\rho_a \in (0, 1)$ and the noise probability $\rho_n \in (0, 1)$ such that $\rho_a + \rho_n < 1$. Then, for each clean input (x, y), the simulator 110 randomly selects one of three modes and, accordingly, alters the corresponding pair as Equation 5 below.

$$(x, y) \mapsto \begin{cases} (x, y) & \text{with probability } 1 - \rho_a - \rho_n \\ (W(x, M), c(y)) & \text{with probability } \rho_a \\ (W(x, M + \text{rand}_{[-1,\lambda]}(h, w, 2)), y) & \text{with probability } \rho_n \end{cases} \qquad \text{[Equation 5]}$$

In an embodiment, instead of using a totally random noise warping field M' in the noise mode, the simulator 110 forms the noise warping field M' by adding Gaussian noise to the warping field M for more effective training. Then, the simulator 110 uses the modified training set to train the function f.

Hereinafter, a process and result of experimenting that a novel backdoor model may be a practical threat by being deployed for physical attacks will be described with reference to FIGS. 6 to 10 and Table 1. In the experiment, a backdoor classifier is tested with camera-captured images of physical screens. Despite image quality degradation via extreme capturing conditions, the backdoor model is well-preserved and the attack accuracy stays near 100%.

Following the previous backdoor attack papers, we performed experiments on four datasets: MNIST (LeCun et al., 1998), CIFAR-10 (Krizhevsky et al., 2009), GTSRB (Stallkamp et al., 2012) and CelebA (Liu et al., 2015). Note that CelebA dataset has annotations for 40 independent binary attributes, which is not suitable for multi-class classification. Therefore, we follow the configuration suggested by Salem et al. (2020) to select the top three most balanced attributes, including Heavy Makeup, Mouth Slightly Open, and Smiling, then concatenate them to create eight classification classes. Their detail information are shown in Table 1. To build the classifier f for the color image datasets, we used Pre-activation Resnet-18 (He et al., 2016) for the CIFAR-10 and GTSRB datasets as suggested by Kang (2020), and Resnet-18 for the CelebA dataset.

As for the grayscale dataset MNIST, a simple network structure was defined as reported in Table 1.

TABLE 1

| Dataset | Subjects | #Classes | Input Size | #Train. Images | Classifier |
|---|---|---|---|---|---|
| MNIST | Written digits | 10 | 28 × 28 × 1 | 60,000 | 3 ConvBlocks, 2 fcs |
| CIFAR-10 | General objects | 10 | 32 × 32 × 3 | 50,000 | PreActRes18 |
| GTSRB | Traffic signs | 43 | 32 × 32 × 3 | 39,252 | PreActRes18 |
| CelebA | Face attributes | 8 | 64 × 64 × 3 | 202,599 | ResNet18 |

The networks were trained by using the SGD optimizer. The initial learning rate was 0.01, which was reduced by a factor of 10 after each 100 training epochs. The networks were trained until convergence with k=4, s=0.5, $\rho_a$=0.1, and $\rho_a$=0.2.

The backdoor models werw trained and tested in all-to-one configuration, i.e., $c(y)=\hat{c} \forall y$. The accuracy values in clean mode, attack mode, and the noise mode are reported in part (a) of FIG. 6. As can be seen, with clean images, the networks could correctly classify them like any benign models, with accuracy near 100% on MNIST/GTSRB, 94.15% on CIFAR-10, and 79.77% on CelebA. When applying the pre-defined image warping, the attack success rate was near 100% on all datasets. However, when using a random warping, the classifiers still recognized the true image class with a similar accuracy as in the clean mode. This result is impressive given the fact that the poisoned images look almost identical to the original, as can be seen in part (b) of FIG. 6.

To evaluate the present embodiment's robustness in real-life scenarios, it is also tested if backdoor images would still be misclassified even when being distorted by the capturing process. It is showed that 50 clean and 50 backdoor images on a screen and recaptured them using a phone camera. The present embodiment's model still worked well on recaptured images, obtaining 98% clean accuracy and 96% attack success rate. Part (c) of FIG. 6 displays an example of the test. The clean image was recognized correctly as "automobile", while the look-a-like backdoor image was recognized as the "airplane" attack class.

To examine the realisticity of the present embodiment's backdoor model and the previous methods, user studies with human inspection were created. First, 25 images were randomly selected from the GTSRB dataset. Second, for each backdoor injection function, the corresponding 25 backdoor images were created and these were mixed with the original to obtain a set of 50 images. Finally, 40 people were asked to classify whether each image was genuine, collecting 2000 answers per method. The participants were trained about the mechanism and characteristics of the attack before answering the questions.

Figure 7:
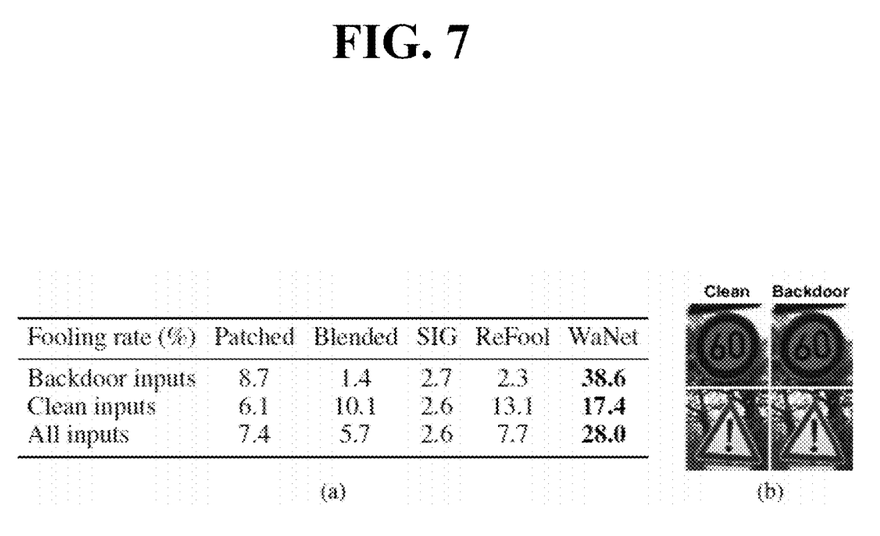
FIG. 7 is a diagram of human inspection tests.
Figure 8:
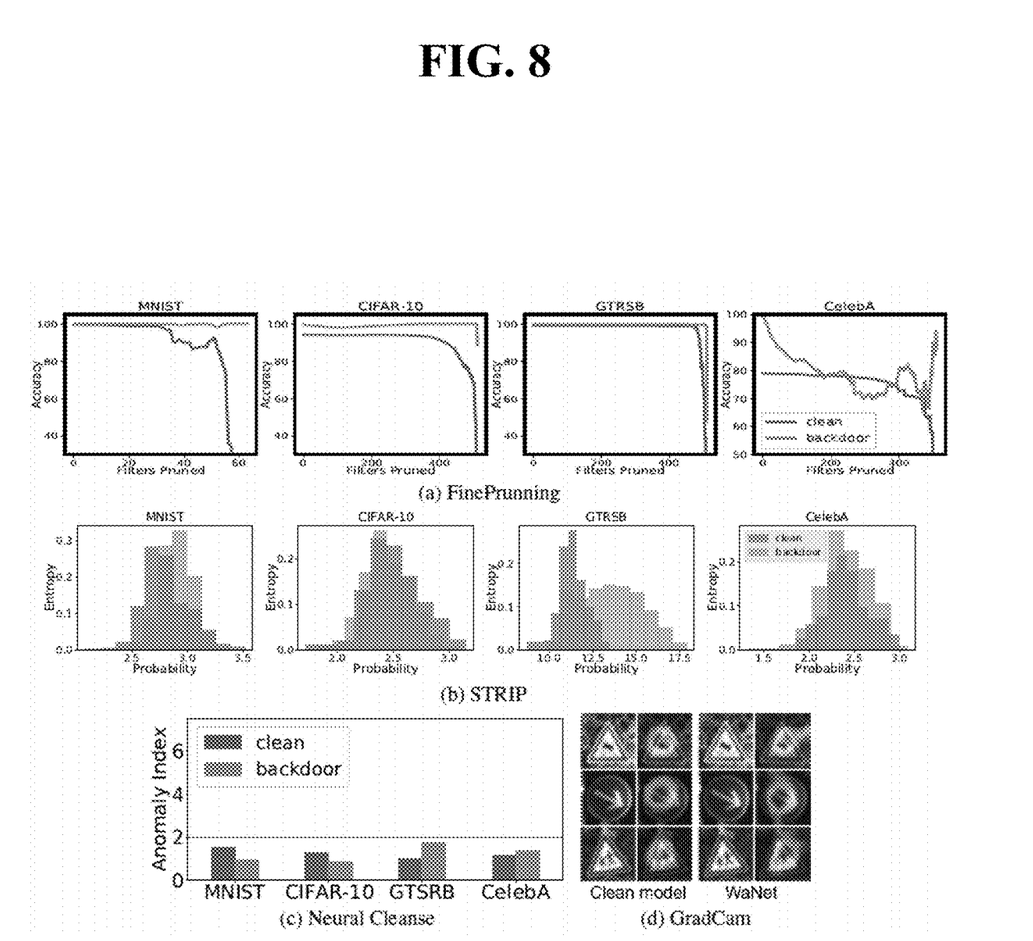
FIG. 8 is a diagram of experiments on verifying WaNet by the state-of-the-art defense and visualization methods.

It is reported that the percentage of incorrect answers as the success fooling rates in part (a) of FIG. 7. Note that when the backdoor examples are more indistinguishable from the clean ones, the testers will find it harder to decide an image is clean or poisoned. Hence, better backdoor methods led to higher fooling rates on not only backdoor inputs but also on clean ones. The rates from previous methods are low, with maximum 7.7% on all inputs, implying that they are obvious to humans to detect. In contrast, the present embodiment's rate is 28%, four times their best number. It confirms that WaNet is stealthy and hard to detect, even with trained people.

Although the present embodiment's backdoor images are natural-looking, some of them have subtle properties that can be detected by trained testers. two of the most detected backdoor examples were provided from WaNet in part (b) of FIG. 7. In the first case, the circle sign is not entirely round. In the second case, the right edge of the traffic sign is slightly curved. Although these conditions can be found on real-life traffic signs, they are not common in the testing dataset GTSRB. These images are of the minority, and the present embodiment's fooling rate on backdoor images is 38.6%, not far away from the rate of 50% in random selection.

The evaluation module 120 assesses whether the backdoor attack simulated by the simulator 110 passes all the pre-set defense techniques. In case it is determined that the simulated backdoor attack passes all the pre-set defense techniques, the evaluation module 120 outputs a warning about the risk of backdoor. In an embodiment, the trained backdoor model was tested against the popular backdoor defense mechanisms, including Neural Cleanse, Fine-Prunning (Model defenses), and STRIPS (Testing-time defense).

Neural Cleanse (Wang et al., 2019) is a model-defense method based on the pattern optimization approach. It assumes that the backdoor is patch-based. For each class label, Neural Cleanse computes the optimal patch pattern to convert any clean input to that attack label. It then checks if any label has a significantly smaller pattern as a sign of backdoor. Neural Cleanse quantifies it by the Anomaly Index metric with the clean/backdoor threshold $\tau$=2. Neural Cleanse were ran over the present embodiment's WaNet models and report the numbers in part (c) of FIG. 8. WaNet passed the test on all datasets; its scores are even smaller than the clean model ones on MNIST and CIFAR-10. It can explain by the fact that the present embodiment's backdoor model relies on warping, a different mechanism compared with patch-based blending.

Fine-Pruning (Liu et al., 2018a), instead, focuses on neuron analyses. Given a specific layer, it analyzes the neuron responses on a set of clean images and detects the dormant neurons, assuming they are more likely to tie to the backdoor. These neurons are then gradually pruned to mitigate the backdoor. Fine-Pruning were tested on the present embodiment's models and plotting the network accuracy, either clean or attack, with respect to the number of neurons pruned in part (a) of FIG. 8. On all datasets, at no point is the clean accuracy considerably higher than the attack one, making backdoor mitigation impossible.

STRIP (Gao et al., 2019) is a representative of the testing-time defense approach. It examines the model with the presence of the input image. STRIP works by perturbing the input image through a set of clean images from different classes and raising the alarm if the prediction is persistent, indicating by low entropy. With WaNet, the perturbation operation of STRIP will modify the image content and break the backdoor warping if present. Hence, WaNet behaves like genuine models, with similar entropy ranges, as shown in part (b) of FIG. 8.

Visualization tools, such as GradCam (Selvaraju et al., 2017), are helpful in inspecting network behaviors. Patch-based backdoor methods can be exposed easily due to the use of small trigger regions, as pointed out by Cheng et al. (2019); Doan et al. (2019). Attack method of the present embodiment's simulator is based on the warping on the entire clean image, so it is undetectable by this algorithm. It is visualized by activation based on the label that has the highest prediction score in part (d) of FIG. 8. With clean models, that label is for the correct class label. With WaNet and backdoor inputs, it is the backdoor label ĉ. As can be seen, the visualization heatmaps of WaNet look like the ones from any clean model.

Figure 10:
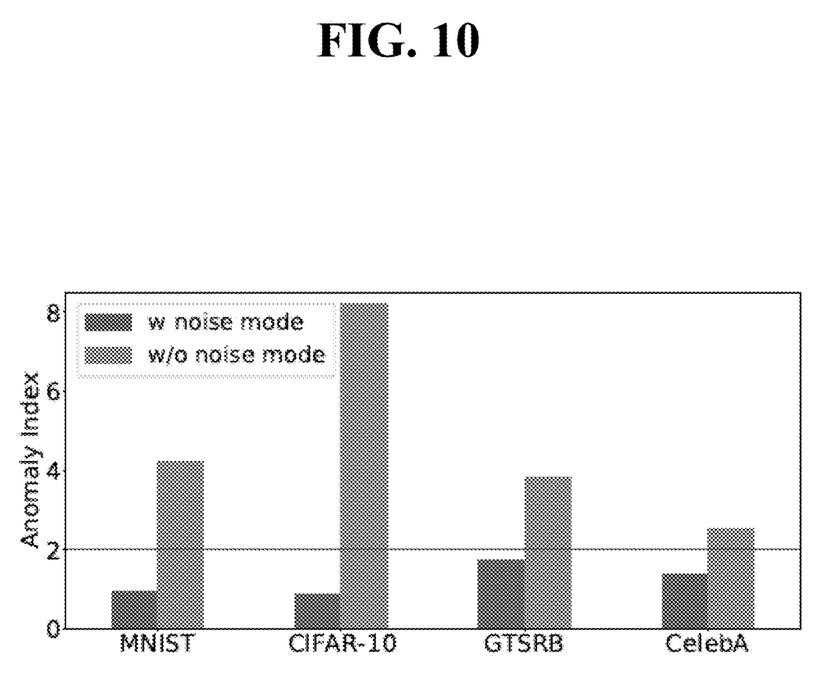
FIG. 10 is a diagram of Networks' performance against Neural Cleanse with and without noise mode.

Role of the noise mode: Without the noise mode, a backdoor model could be still trained with similar clean and attack accuracy. However, these models failed the defense test with Neural Cleanse as shown in FIG. 10, and the optimized trigger patterns revealed their true behavior.

Figure 9:
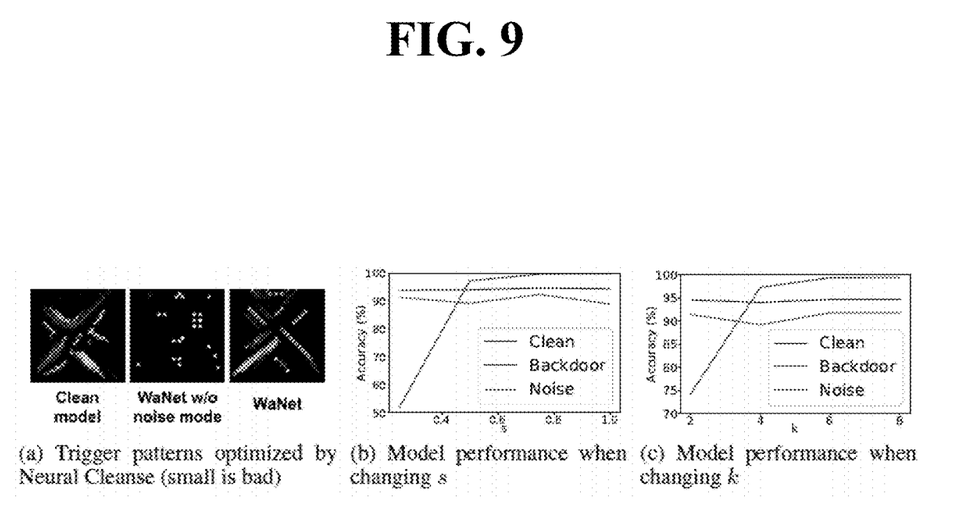
FIG. 9 is a diagram of ablation studies on CIFAR-10 dataset.

Part (a) of FIG. 9 displays the trigger patterns optimized by Neural Cleanse for the attacking class "airplane" on CIFAR-10. With the clean model, this pattern has an airplane-like shape, and it is big enough to rewrite image content given any input. With the present embodiment's model trained without noise mode, the optimized pattern just consists of scattered points. This pattern is remarkably smaller, making the model caught by Neural Cleanse.

It reveals that the model did not learn the specific backdoor warping; instead, it remembered the pixel-wise artifacts. By adding the noise training mode, the present embodiment's model no longer relies on those artifacts, and the optimized pattern looks similar to the clean model's one.

Other hyper-parameters: The effect of the warping hyper-parameters was investigated, including the strength s and the grid size k. Part (b) and (c) of FIG. 9 show the clean, attack, and noise mode accuracy of our network on the CIFAR-10 dataset when changing each of these parameters. When k or s is small, the backdoor images are similar to the clean ones. However, since they are a minority ($\rho_a$=0:1), the network would treat them like data with noisy labels in those scenarios. Hence, clean and noise accuracies are stable across configurations. In contrast, backdoor accuracy suffers on the left side of the plots. It gradually increases when s or k is small, then saturates and stays near 100%.

The backdoor model applied to the system for security assessment according to the embodiment may utilize and manipulate a unique pattern of the image. As with the experimental results, such a method has proven to be effective not only against previously proposed defense techniques but also against human testing.

In an embodiment, it is possible to simulate a new backdoor attack through image warping and evaluate a threat of the backdoor attack. In order to learn such a backdoor model, the standard backdoor learning system is extended by introducing a "noise" learning mode. According to the result of the security evaluation, it has been proven that the attack is effective and that the backdoor cannot be detected by both human and computer defense mechanisms. Since such a backdoor model may be applied to physical attacks, the backdoor model may be a practical threat to deep learning-based systems.

Terms described in the specification such as "unit" refer to software or a hardware component such as a field-programmable gate array (FPGA) or an application-specific integrated circuit (ASIC), and the unit performs certain functions. However, the "unit" is not limited to software or hardware. The "unit" may be configured in an addressable storage medium or may be configured to be executed by at least one processor. Therefore, examples of the "unit" include components such as software components, object-oriented software components, class components and task components, and processes, functions, attributes, procedures, subroutines, segments of program code, drivers, firmware, micro code, circuits, data, databases, data structures, tables, arrays, and variables. Components and functions provided in "units" may be combined into a smaller number of components and "units" or may be further separated into additional components and "units." In addition, the components and the "units" may be implemented to playback one or more CPUs in a device or a secure multimedia card.

The system for security assessment according to the embodiment can simulate and evaluate a backdoor attack that demonstrates concealment by exerting much better performance than the previous method.

Further, the system for security assessment can simulate and evaluate a new "noise" learning mode designed to prevent detection by machine defenders.

Further, the network trained according to the system for security assessment according to the embodiment can successfully attack and bypass state-of-the-art defense methods in standard classification datasets including MNIST, CIFAR-10, GTSRB, and CelebA.

Further, behavior analysis shows that the backdoor attack is transparent to network inspections, and it is possible to recognize the dangers of such a novel attack mechanism.

While the exemplary embodiments of the present invention and their advantages have been described above in detail, it should be understood by those skilled in the art that various changes, substitutions and alterations may be made herein without departing from the scope of the invention as defined by the following claims.

What is claimed is:

1. A method for security assessment of a warping-based backdoor attack, the method comprising:
    receiving, by a warping unit, a clean image as an input;
    outputting, by the warping unit, a warped backdoor image;
    training a backdoor model using the warped backdoor image;
    detecting and issuing a warning about a backdoor risk in response to an attack, based on the backdoor model,
    wherein the warping unit is configured to deform an image by applying geometric transformation, wherein the geometric transformation is performed by at least one method selected from the group consisting of affine, projective, elastic, and non-elastic;
    generating, by a simulator, a warping field;
    receiving, by the warping unit, the clean image and the warping field as inputs and outputting the warped backdoor image; and
    training, by the simulator, the backdoor model by using the warped backdoor image,
    wherein the generating the warping field comprises:
    determining control points, wherein the simulator is configured to:
        select target points on a uniform grid of a predetermined size over the entire clean image; and
        generate a backward warping field of the selected target points;
    upsample by interpolating an interpolated warping field of the entire clean image from the control points by applying a bicubic interpolation; and
    clip the interpolated warping field to generate the warping field.

2. The method of claim 1, wherein the predetermined size of the uniform grid is k×k, where k<6, and
    wherein a parameter s defining the strength of the backward warping field is below 0.75.

3. The method of claim 1, wherein the training the backdoor model, for each clean image, comprises:
   selecting one of clean mode, attack mode and noise mode randomly; and
   training the backdoor model in the selected mode.

4. The method of claim 3, wherein the training the backdoor model in the clean mode comprises:
   classifying, by the backdoor model, the clean image into a clean label corresponding to the clean image.

5. The method of claim 3, wherein the training the backdoor model in the attack mode comprises:
   classifying, by the backdoor model, the warped backdoor image into an attack label.

6. The method of claim 3, wherein the training the backdoor model in the noise mode comprises:
   generating, by the simulator, a noise warping field by adding random noise to the warping field;
   receiving, by the warping unit, the clean image and the noise warping field as inputs and outputting a noise warped backdoor image; and
   classifying, by the backdoor model, the noise warped backdoor image into the clean label corresponding to the clean image.

7. The method of claim 6, wherein the noise warping field is generated by adding Gaussian noise to the warping field.

8. A non-transitory computer-readable storage medium comprising instructions that, when executed by at least one processor of a machine, cause the machine to perform the method of claim 1.

9. A system for security assessment of a warping-based backdoor attack, the system comprising:
   one or more memories including computer-executable instructions; and
   one or more processors configured to execute the computer-executable instructions, the computer-executable instructions when executed configured to:
   receive, by a warping unit, a clean image as an input;
   output, by the warping unit, a warped backdoor image;
   train a backdoor model using the warped backdoor image; and
   detect and issue a warning about a backdoor risk in response to an attack, based on the backdoor model,
   wherein the warping unit is configured to deform an image by applying geometric transformation, wherein the geometric transformation is performed by at least one method selected from the group consisting of affine, projective, elastic, and non-elastic,
   wherein the system further comprises a simulator, which is configured to generate a warping field,
   wherein the warping unit is configured to receive the clean image and the warping field as inputs and output the warped backdoor image,
   wherein the simulator is configured to train the backdoor model using the warped backdoor image, and
   wherein the simulator is configured to determine control points by:
      selecting target points on a uniform grid of a predetermined size over the entire clean image; and
      generating a backward warping field of the selected target points;
   upsample by interpolating an interpolated warping field of the entire clean image from the control points by applying a bicubic interpolation; and
   clip the interpolated warping field to generate the warping field.

10. The system of claim 9, wherein the predetermined size of the uniform grid is k×k, where k<6, and
    wherein a parameter s defining the strength of the backward warping field is below 0.75.

11. The system of claim 9, wherein for each clean image, the simulator is configured to perform:
    selecting one of clean mode, attack mode and noise mode randomly; and
    training the backdoor model in the selected mode.

12. The system of claim 11, wherein the simulator is configured to train the backdoor model in the clean mode, in which the backdoor model is configured to classify the clean image into a clean label corresponding to the clean image.

13. The system of claim 11, wherein the simulator is configured to train the backdoor model in the attack mode, in which the backdoor model is configured to classify the warped backdoor image into an attack label.

14. The system of claim 11, wherein the simulator is configured to train the backdoor model in the noise mode, in which:
    the simulator is configured to generate a noise warping field by adding random noise to the warping field;
    the warping unit is configured to receive the clean image and the noise warping field as inputs and output a noise warped backdoor image; and
    the backdoor model is configured to classify the noise warped backdoor image into the clean label corresponding to the clean image.

15. The system of claim 14, wherein the simulator is configured to generate the noise warping field by adding Gaussian noise to the warping field.

* * * * *